(12) United States Patent
Wilkes

(10) Patent No.: US 10,378,577 B2
(45) Date of Patent: Aug. 13, 2019

(54) STEERING COLUMN ASSEMBLIES

(71) Applicant: TRW Limited, Solihull, West Midlands (GB)

(72) Inventor: Mark Anthony Wilkes, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 95 days.

(21) Appl. No.: 15/529,589

(22) PCT Filed: Nov. 25, 2015

(86) PCT No.: PCT/GB2015/053591
§ 371 (c)(1),
(2) Date: May 25, 2017

(87) PCT Pub. No.: WO2016/083802
PCT Pub. Date: Jun. 2, 2016

(65) Prior Publication Data
US 2017/0261028 A1 Sep. 14, 2017

(30) Foreign Application Priority Data

Nov. 25, 2014 (GB) .................................. 1420942.3

(51) Int. Cl.
*F16C 3/035* (2006.01)
*B62D 1/185* (2006.01)
(Continued)

(52) U.S. Cl.
CPC .............. *F16C 3/035* (2013.01); *B62D 1/185* (2013.01); *F16C 19/08* (2013.01); *F16C 19/26* (2013.01);
(Continued)

(58) Field of Classification Search
CPC .......... F16C 3/035; F16C 33/46; F16C 33/40; F16C 19/26; F16C 19/08; F16C 29/04; F16C 2326/24; B62D 1/185; G01D 5/204
See application file for complete search history.

(56) References Cited

U.S. PATENT DOCUMENTS 3,649,094 A * 3/1972 Russell ................. F16C 19/163
384/533
3,801,171 A * 4/1974 Rozentals ............. F16C 19/163
384/492
(Continued)

FOREIGN PATENT DOCUMENTS

AU 59580/80 A 1/1981
DE 3808271 C1 10/1989
(Continued)

OTHER PUBLICATIONS

Patents Act 1977: Search Report under Section 17(5), Application No. GB1420942.3, dated May 19, 2015.
(Continued)

*Primary Examiner* — Paul N Dickson
*Assistant Examiner* — Timothy Wilhelm
(74) *Attorney, Agent, or Firm* — MacMillan, Sobanski & Todd, LLC

(57) ABSTRACT

A telescopic steering column assembly comprising an upper shroud portion and a lower shroud portion is supported by the shroud portions through a support bearing assembly that acts between an upper portion of the telescopic steering shaft and a lower portion of the shroud that move relative to one another axially during telescopic adjustment, in which the support bearing assembly comprises: a set of bearings elements, a bearing cage comprising a sleeve that is located between an outer face of the upper shaft and an inner face of the lower shroud portion and is free to move axially relative to one of the upper shaft and the lower shroud, the
(Continued)

cage including pockets that extend through the sleeve, each pocket loosely locating a bearing element such that a portion of the bearing element extends through the cage to engage with a first bearing race surface defined by one of the upper shaft and the shroud, an annular bearing race having a tapered second bearing race surface that engages the bearing elements located between the cage and the upper shaft or the cage and the lower shroud so that the annular bearing race is on the opposite side of the cage to the first bearing surface, and a biasing means which applies an axially directed thrust to the bearing elements to force them into engagement with the second bearing surface of the annular bearing race the thrust being reacted by the second bearing surface.

21 Claims, 13 Drawing Sheets

(51) Int. Cl.
    *G01D 5/20*     (2006.01)
    *F16C 29/04*     (2006.01)
    *F16C 19/08*     (2006.01)
    *F16C 19/26*     (2006.01)
    *F16C 33/40*     (2006.01)
    *F16C 33/46*     (2006.01)

(52) U.S. Cl.
    CPC .............. *F16C 29/04* (2013.01); *F16C 33/40* (2013.01); *F16C 33/46* (2013.01); *G01D 5/204* (2013.01); *F16C 2326/24* (2013.01)

(56) References Cited

U.S. PATENT DOCUMENTS

| | | | | |
|---|---|---|---|---|
| 3,876,266 A * | 4/1975 | Rozentals | ................ | F16C 33/60 384/536 |
| 3,883,194 A * | 5/1975 | Pitner | ................... | F16C 19/466 384/582 |
| 4,541,742 A * | 9/1985 | Lederman | ................ | B62D 1/16 384/518 |
| 6,227,715 B1 * | 5/2001 | Erhardt | .................... | B62D 1/16 384/518 |
| 6,343,993 B1 * | 2/2002 | Duval | ...................... | B62D 1/16 384/49 |
| 6,846,110 B2 * | 1/2005 | Lutz | ...................... | F16C 19/166 384/517 |
| 7,322,607 B2 * | 1/2008 | Yamada | ................... | B62D 1/16 280/755 |
| 7,404,768 B2 * | 7/2008 | Yamada | ................. | B62D 1/185 384/54 |
| 7,416,216 B2 * | 8/2008 | Shoda | .................... | B62D 1/185 280/775 |
| 7,526,978 B2 * | 5/2009 | Bahr | ....................... | F16C 3/035 464/167 |
| 8,298,093 B2 * | 10/2012 | Kwon | ...................... | B62D 1/16 464/167 |
| 8,398,496 B2 * | 3/2013 | Bahr | ........................ | B62D 1/16 384/10 |
| 8,827,821 B2 * | 9/2014 | Buzzard | ................... | B62D 1/20 464/167 |
| 8,926,189 B2 * | 1/2015 | Delos | ....................... | B62D 1/16 384/539 |
| 8,931,805 B2 * | 1/2015 | Buzzard | ................. | F16D 3/065 280/775 |
| 8,997,601 B2 * | 4/2015 | Erhardt | ..................... | B62D 1/16 74/492 |
| 9,021,910 B2 * | 5/2015 | Arlt | ..................... | F16H 25/2204 74/388 PS |
| 9,068,590 B2 * | 6/2015 | Bussit | ....................... | B62D 1/16 |
| 9,279,448 B2 * | 3/2016 | Bussit | .................... | F16C 19/06 |
| 9,341,216 B2 * | 5/2016 | Bussit | ................... | F16C 35/073 |
| 9,353,794 B2 * | 5/2016 | Pabst | ..................... | F16C 19/466 |
| 9,566,996 B2 * | 2/2017 | Wilkes | ..................... | B62D 1/192 |
| 9,803,684 B2 * | 10/2017 | Ryne | ........................ | F16C 3/035 |
| 9,945,420 B2 * | 4/2018 | Dupuis | ..................... | B62D 1/16 |
| 2005/0105838 A1 * | 5/2005 | Brauer | .................... | F16C 19/20 384/492 |
| 2008/0125231 A1 * | 5/2008 | Fujita | ..................... | B62D 1/185 464/169 |
| 2010/0130293 A1 | 5/2010 | Eriksson et al. | | |
| 2014/0349772 A1 * | 11/2014 | Daenzer | ................. | F16D 3/065 464/167 |
| 2017/0328400 A1 * | 11/2017 | Muntener | .............. | B21D 15/02 |
| 2017/0356487 A1 * | 12/2017 | Muntener | ............... | B62D 1/16 |
| 2018/0154922 A1 * | 6/2018 | Abonyi | ..................... | B62D 1/16 |
| 2018/0229756 A1 * | 8/2018 | Appleyard | ............. | B62D 1/185 |

FOREIGN PATENT DOCUMENTS

| | | |
|---|---|---|
| DE | 19724492 A1 | 12/1998 |
| FR | 602209 A | 3/1926 |
| GB | 2459959 A | 11/2009 |
| WO | 2015/011479 A1 | 1/2015 |

OTHER PUBLICATIONS

PCT International Search Report and the Written Opinion, Application No. PCT/GB2015/053591 filed Nov. 25, 2015, dated Mar. 1, 2016.

\* cited by examiner

STEERING COLUMN ASSEMBLIES

CROSS-REFERENCE TO RELATED APPLICATIONS

This application is a national stage of International Application No. PCT/GB2015/053591, filed 25 Nov. 2015, the disclosures of which are incorporated herein by reference in entirety, and which claimed priority to Great Britain Patent Application No. 1420942.3 filed 25 Nov. 2014, the disclosures of which are incorporated herein by reference in entirety.

BACKGROUND OF THE INVENTION

This invention relates to an improved steering column assembly.

There are many applications in which it is desirable for a steering column apparatus to be telescopic so that the length of the steering column can be adjusted. By allowing part of the shaft or shroud to move telescopically over another, the steering assembly can be adjusted for reach. In a crash, where a driver impacts the steering wheel, this can also allow the wheel to move and by controlling the rate at which the telescopic movement occurs, it is possible to absorb the energy in the crash in a controlled manner.

In a typical arrangement the steering column includes a telescopic shroud having an upper and a lower tubular shroud portion. There is typically a slit in the top surface of the upper tube which extends along a large portion (usually more than half) of its length and which enables the upper tubular portion to be squeezed into firm contact with the lower tubular portion by means of a driver-operated clamping mechanism which is assembled around a so-called adjustment clamp bolt. The clamp bolt is typically able to slide in a generally vertical direction in slots in a vehicle mounted so-called Rake Bracket in order to make the steering wheel adjustable for height. The steering wheel actually adjusts in an arc centred on a Pivot Axis which is usually designed as part of the lower mounting means where an optional Electric Power Steering (EPS) unit mounts to the vehicle at the lower end of the overall Column and EPS assembly. The Clamp Bolt also passes through generally horizontal slots in the clamp brackets which form an upper part of the upper tube in order to allow the steering wheel to be adjusted for Reach.

Where an electric power steering unit is incorporated into the column, in a common arrangement the upper tube, by which we mean the one nearest the steering wheel, is the outer tube with the lower tube slidably located within the upper tube. In such an arrangement it is conventional to support the upper column shaft by one ball bearing assembly located at the upper end of the upper column tube and also lower down via a splined sliding interface with lower shaft portion that forms the Input Shaft of the EPS unit. The EPS Input Shaft is typically cantilevered from two closely spaced bearings within the gearbox of an EPS unit. The resistance to bending of the pair of shafts, i.e. the Upper Column Shaft and the EPS Input Shaft critically depends on the bending stiffness of the said sliding interface which, because it must slide freely to allow the upper column to telescope, must possess some, albeit small, clearances. This method of supporting the Upper Column Shaft, while economical, makes it difficult to achieve the minimum natural vibration frequency target (typically 50 Hz) which vehicle manufacturers usual impose. Historically, this target has been aimed at minimizing steering wheel shake due to engine vibrations or road roughness. More recently, some vehicle manufacturers have been specifying still higher targets to avoid steering wheel shake during the operation of automatic engine stop-start fuel saving strategies.

BRIEF SUMMARY OF THE INVENTION

It is a feature of the present invention to improve the performance of a steering column assembly such as the kind described above.

According to a first aspect, the invention provides a telescopic steering column assembly comprising an upper shroud portion and a lower shroud portion, the two shroud portions being able to move relatively along a common linear path during telescopic adjustment, a telescopic steering shaft that passes through the upper and lower shroud portions and is supported by the shroud portions through a support bearing assembly that acts between an upper portion of the telescopic steering shaft and a lower portion of the shroud that move relative to one another axially during telescopic adjustment of the steering assembly for reach, the support bearing assembly in use removing free play between the shaft and the shroud portions that would otherwise occur in at least one direction orthogonal to the telescopic movement, in which the support bearing assembly comprises:

a set of bearings elements, a bearing cage comprising a sleeve that is located between an outer face of the upper shaft and an inner face of the lower shroud portion and is free to move axially relative to one of the upper shaft and the lower shroud, the cage including pockets that extend through the sleeve, each pocket loosely locating a bearing element such that a portion of the bearing element extends through the cage to engage with a first bearing race surface defined by one of the upper shaft and the shroud, an annular bearing race having a tapered second bearing race surface that engages the bearing elements, the annular bearing race being located between the cage and the upper shaft or the cage and the lower shroud so that the annular bearing race is on the opposite side of the cage to the first bearing surface, and a biasing means which applies an axially directed thrust to the bearing elements to force them into engagement with the second bearing surface of the annular bearing race, the thrust being reacted by the second bearing surface thereby to cause the bearing elements additionally to apply a radial force onto the first bearing surface.

The bearing elements may be ball bearings that are arranged at spaced locations around the circumference of the cage.

There may be two spaced sets of ball bearings, each set being arranged around a respective circular path that is spaced apart from the circular path of the other set.

Alternatively the bearing elements may be roller bearings. Where they are roller bearing the long axis of each roller bearing may be parallel to the axis of the upper shaft. The pockets may be elongated to accommodate each roller bearing.

Where the bearing elements are roller bearings, the end faces of the bearing elements may be chamfered or tapered, with a straight of curved face, in the regions that contact the second bearing surface. The taper or chamfer may be approximately complimentary to the taper of the annular bearing race.

The annular bearing race may be fixed in position relative to one of the upper shaft and the lower shroud portion that does not define the first bearing surface, whilst the cage may be free to move axially relative to the first bearing surface.

The assembly may comprise end stops which hold the bearing rings in place on the bearing assembly. The biasing means may act to apply an axial force between an end stop or abutment ring and the bearing elements, the end stop or abutment ring being prevented from moving axially relative to the bearing cage.

The end stop or abutment ring may extend radially away from the cage on the opposite side to the first bearing surface. Thus, when the upper shaft forms the first bearing surface the ring may extend radially outward from the cage. Where the lower shroud forms the first bearing surface the ring may extend radially inward from the cage towards the axis of the cage.

The contact angle of the second bearing face may bisect the axis of the shaft or shroud at an angle of between 20 and 70 degrees. The choice of angle determines how much of the force applied by the biasing means is reacted as a radial force that passes through the bearings. For instance, if there is almost no taper (bisects at say 85 degrees) only a very small portion of any applied axial force from the biasing means will be reacted by the bearing elements as radial load on the bearing races.

The lower shroud may form the first bearing surface or the upper shaft may form the first bearing surface.

Where the upper shaft forms the first bearing surface, the taper may define a concave surface, i.e. facing towards to the axis.

Where the lower shroud forms the first bearing surface the taper may define a convex surface. i.e., facing away from the axis.

The annular bearing race may comprise a thrust ring.

In a first convenient arrangement, the annular bearing race may comprise an annular thrust ring defining two opposed tapered second bearing faces arranged respectively on opposing sides of a centre line of the ring, the bearing elements may comprise ball bearings and may be divided into two sets of elements with the bearings of each set arranged around a circumferential path, one set engaging one of the second bearing faces and the other set the other bearing face so that the ring is located substantially between the two sets bearing elements.

Where there are two sets of bearing elements as described, the pockets in the cage may be arranged as two sets of pockets, the pockets of one set being spaced around a path that extends around a circular path around the cage spaced apart from the pockets of the other set that also extend around a circular path around the cage, the annular bearing element being aligned generally between the two circular paths.

The biasing means may act between an end stop located on the cage axially spaced to a first side of the bearing elements and ring.

The biasing means may comprise two springs, each associated with an end stop on a respective side of the annular bearing race, for instance each at a respective end of the bearing cage.

The springs may comprise wavy washers that are coaxial with the upper shaft.

A spacer defining a race ring may be provided that is located between the biasing means and the bearing elements, so that the biasing means acts on the bearing elements through the race ring. The race ring may also include a tapered third bearing race surface on which the bearing elements can roll in use as the steering is turned. The race ring may be the annular bearing race.

Where there are two sets of bearing elements. There may be two race rings, each one between a spring and one of the sets of bearings. The annular bearing race may comprises at least one race ring.

The cage may be a sliding fit onto the upper shaft and the annular bearing race may be located coaxially around the cage and in engagement with the inner surface of the shroud so that it cannot move axially. The shaft in this case will define the first bearing surface.

Alternatively, the cage may be a sliding fit into the shroud and the annular bearing race may be located coaxially inside the cage and in engagement with the surface of the upper shaft. The annular bearing may be prevented from moving axially along the upper shaft.

One of the end stops may comprise a radially extending flange formed integral to the cage, and the other may be a removable radially extending flange secured to the cage by tabs that engage in holes or by a threaded engagement.

The spacing between the flanges may be adjustable to allow the radial load to be adjusted.

The shaft in the ball bearing arrangements will form the first bearing surface.

In the case where the bearing elements are roller elements with tapered ends, the roller elements may be located at spaced positions around a circumference of the upper shaft with the cage slid onto the upper shaft so that the bearings contact the upper shaft, and the annular bearing second race may comprise a pair of rings that each have a tapered face defining a second bearing race, the rings being located at a respective end of the rollers, a support being provided that fits around the rings and defines a pair of end stops, the two rings and the bearings being located between the end stops, and the biasing means acting between at least one end stop and one of the ends of the bearings.

The biasing means may comprise a wavy washer that fits coaxially onto the upper shaft.

The biasing means may act on the ends of the roller bearings through a race ring defining a third bearing surface.

One of the end stops may be removable from the support and may be adjustable to enable the spacing between the end stops to be varied thereby to adjust the radial load on the bearing.

The upper shaft in the arrangement of the preceding paragraph defines the first bearing surface.

In an alternative, the cage may be slid into the shroud and the support that bears the end stops may be located on the upper shaft inside the cage, a pair of bearing elements each defining a second bearing race being slid onto the support, and the biasing means acting between the end stop and one of the annular second bearing elements.

In the arrangement of the preceding paragraph the shroud defines the first bearing surface.

The support may be fixed in position axially relative to the upper shaft or shroud.

The end stops, abutment rings or race rings may comprise components fixed axially onto the lower shroud portion. For example the end stops, abutment rings or race rings may comprise components fixed via press fitting.

In the case where the bearing elements are roller elements with tapered ends, the roller elements may be located at spaced positions around a circumference of the upper shaft with the cage slid onto the upper shaft so that the bearings contact the upper shaft, and the annular bearing second race may comprise a pair of rings that each have a tapered face defining a second bearing surface, the rings being located at a respective end of the rollers, one race ring and the bearings being located between the end stops, and the biasing means acting between at least one end stop and one of the ends of the bearings, wherein the end stops are an abutment ring and a second race ring fixed to the inner surface of the lower shroud portion by press fitting.

The lower shroud may form the first bearing surface or the upper shaft may form the first bearing surface.

Alternatively the cage may be fixed axially in position relative to the lower shroud.

The applicant has appreciated that an apparatus of the invention may be arranged such that the radial preload applied by the biasing means generates sufficiently rigid radial contact between the bearing and the shaft or shroud (or both) to significantly reduce any steering assembly movement due to vibration, yet the associated axial friction can be readily overcome by a driver during adjustment of the assembly for reach. This will be set by the biasing means strength, the angles of the various mating faces between the bearing race parts, ball bearings and biasing means, and the coefficient of friction and area of the contact between the bearing elements and the first bearing surface.

The cage may comprise a plastic sleeve. It may be free to slide over the upper shaft or shroud (whichever is forming the first bearing surface) to permit adjustment of the assembly for reach.

The bearing elements and biasing ring may be prevented from moving away from the first bearing race by a second flange formed on the sleeve.

The biasing means may conveniently comprise a wavy washer that is located between the sleeve (for instance a flange on the sleeve) and the first one of the bearing race parts.

The wavy washer spring will contact the bearing part at a number of circumferentially spaced locations around the washer and the flange at other circumferentially spaced locations there between.

The wavy washer spring preferably comprises a metal disk with a central hole through which the inner sleeve passes, the metal disk being deformed out of a single plane by varying amounts around its circumference, hence the "wave".

In use the biasing means may be under slight compression so that an axial thrust is applied to the bearing part that is reacted by the sleeve.

The biasing means, for example a "Wavy Washer" compression spring may apply axial forces, via a circumferentially split Thrust Ring, to the first one of the race parts against which the balls have rolling contact, the thrust ring applying a radial load to the bearing at the same time as the axial thrust so as to support the bearing race part radially.

To allow the spacing between the two race parts to be controlled, the annular bearing Race part that is free to move axially must be a clearance fit over or within the associated Sleeve to ensure that it can slide, irrespective of tolerance variations in the parts. However, if the race is not radially supported somehow, this clearance will negate the effectiveness of the bearing assembly. The Thrust Ring (split) therefore supports the bearing Race—Moving via its angled face, effectively removing the said clearance.

Other advantages of this invention will become apparent to those skilled in the art from the following detailed description of the preferred embodiments, when read in light of the accompanying drawings.

DETAILED DESCRIPTION OF THE INVENTION

Figure 1:
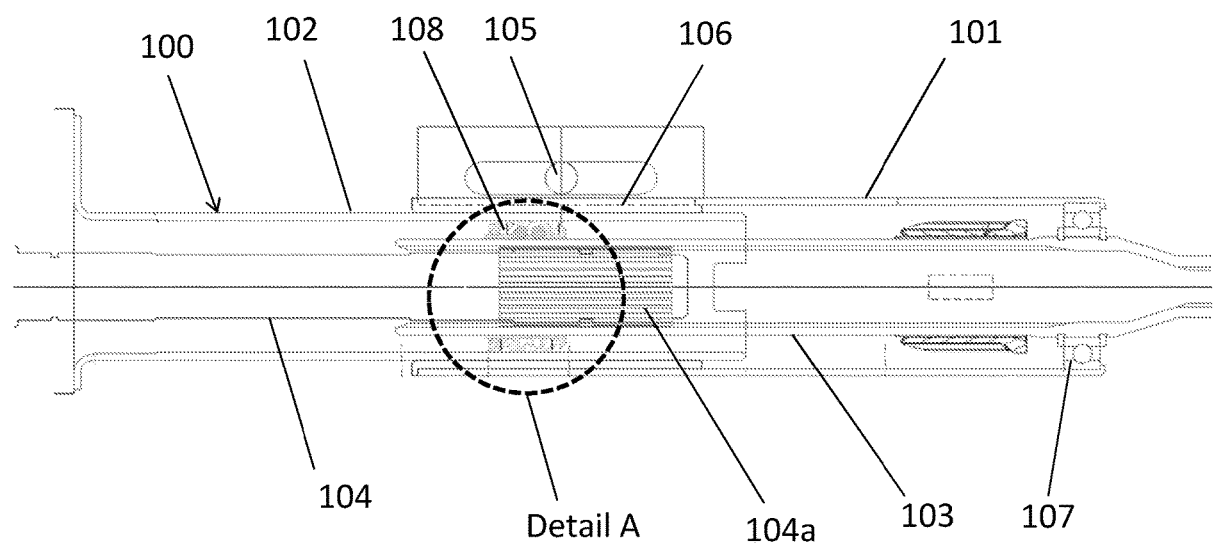
FIG. 1 is a vertical cross sectional view of a first embodiment of a steering column assembly of the present invention.
Figure 2:
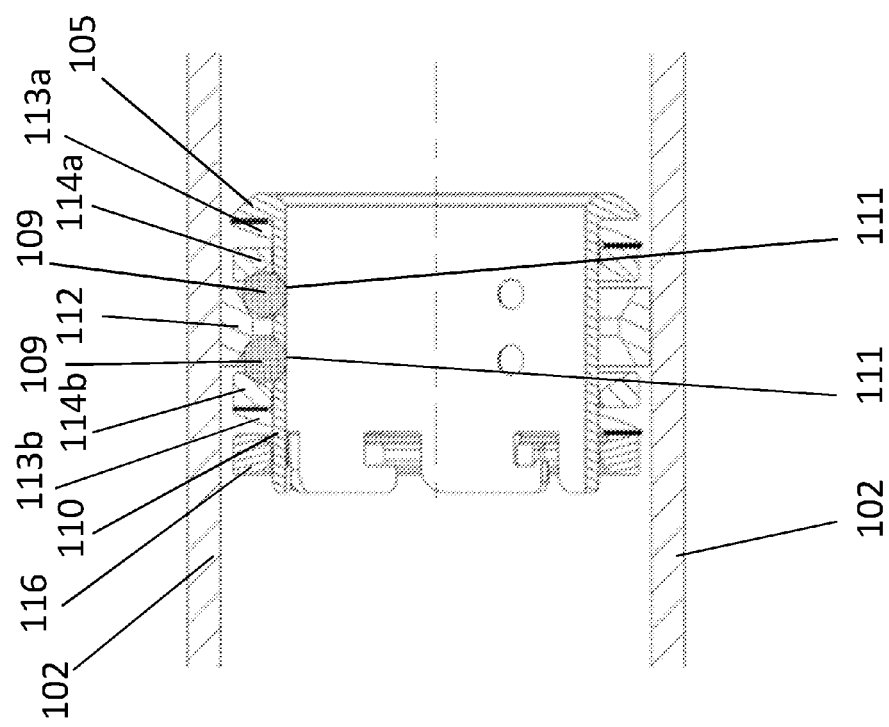
FIG. 2 is cross sectional view of a part of the steering column assembly that is circled as Detail A in FIG. 1, including the extra column bearing assembly that sits between the upper shaft and the lower shroud portion along with a view of the adjacent part of the shrouds.
Figure 3:
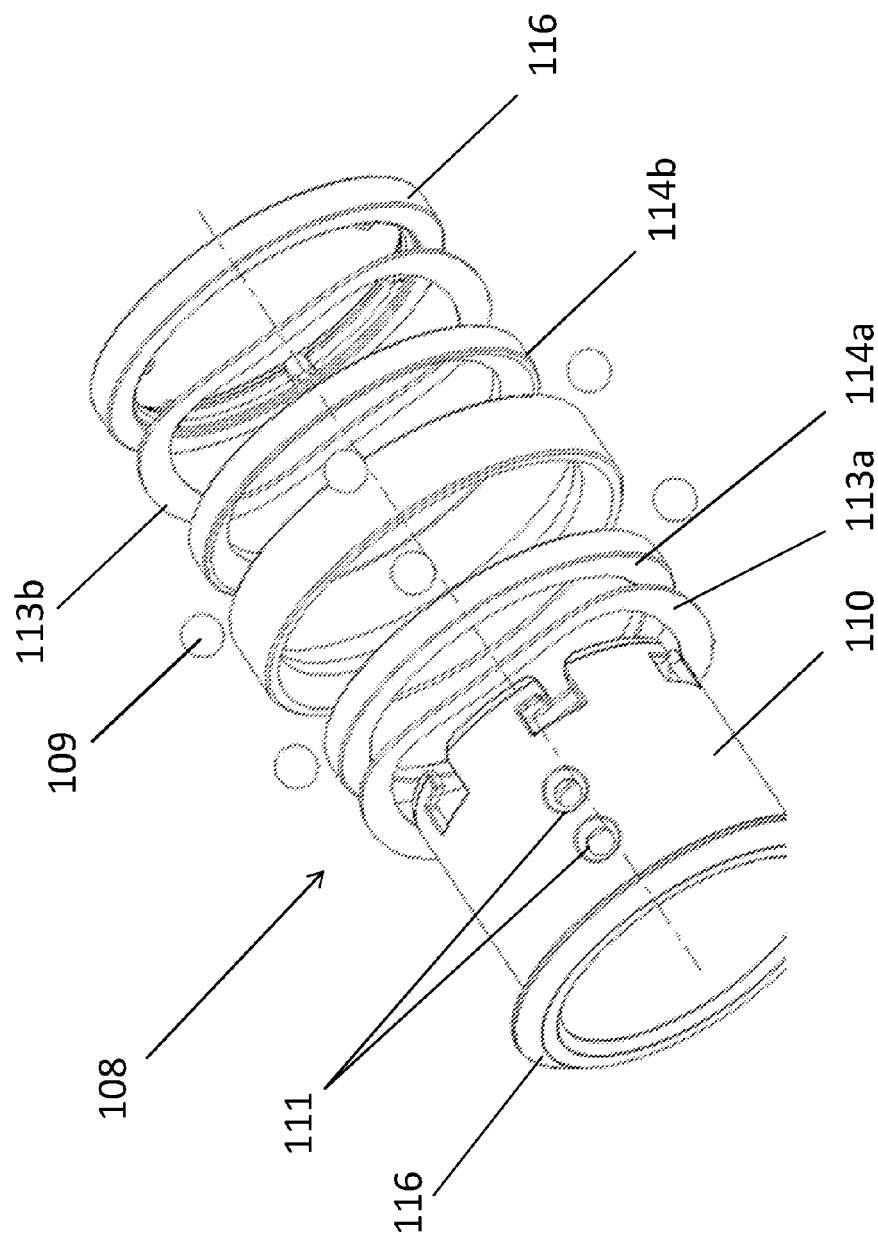
FIG. 3 is an exploded view of the extra column bearing assembly of FIGS. 1 and 2.

FIGS. 1 to 3 provide a view of a first embodiment of a steering column assembly 100 which includes a telescopic arrangement within the scope of the first aspect of the present invention.

FIG. 1 shows the steering column assembly 100 comprising a shroud 101, 102 which comprises a tubular upper shroud portion 101 and a tubular lower shroud portion 102, each of which comprises a cylindrical tube. The shroud portions 101, 102 are moveable relative to each other with the end of the upper shroud portion 101 being a sliding fit within an end of the lower shroud portion 102. The shroud portions 101, 102 surround a telescopic steering column shaft 103, 104. The shaft 103,104 comprises an upper shaft portion 103 that at least partially surrounds a lower shaft portion 104, the two portions being connected through complimentary axially extending splines 104a. The opposite end of the upper shaft 103 is tapered so that it can be secured to a steering wheel (not shown). The lower shaft portion 104 is connected to an optional electric power steering gearbox which in turn connects to the road wheels of the vehicle.

The upper shaft portion 103 fits over the lower shaft portion 104 and the upper shaft portion 103 moves whilst the lower shaft portion 104 does not move axially. Similarly, the upper, outer shroud portion 101 is located towards the steering wheel and slides over the lower, inner shroud portion 102. The lower shroud portion 102 is axially fixed to a gearbox (not shown). The tubular upper shroud portion 101 may be secured to a fixed part of the vehicle using a clamp mechanism (of which only a clamp bolt 105 is shown) that clamps onto a rail 106 on the upper shroud portion 101. A slit is provided in the upper, outer shroud 101 that is closed up as the clamp assembly is closed to cause the upper, outer shroud portion 101 to grip the lower, inner shroud portion 102.

An upper column bearing assembly 107 is located between the upper shaft 103 and the inner surface of the upper shroud portion 101. This snugly fills the space and ensures that the shaft 103 is located securely within the shroud 101.

An extra column bearing assembly 108 is provided between the inner shroud portion 102 and the upper shaft 103, in the region where they overlap, providing support for the shaft 103, 104 close to the joint between the two shaft portions. In use the extra support bearing assembly 108 removes the free play that would otherwise exist and this increases the minimum resonant natural frequency of the whole assembly compared with the same assembly without the support bearing assembly 108. This can provide a welcome improvement in the levels of NVH (noise, vibration and harshness) perceived by a user when the vehicle is travelling along a rough surface. The outer shroud portion 102, support bearing assembly 107 and shaft 103, 104 together form a telescopic assembly within the scope of the first aspect of the invention.

To allow the length of the shroud 101,102 to be adjusted, the lower, inner shroud portion 102 must be free to move axially relative to the upper, outer shroud 101. To this end, the support bearing assembly 108 is fixed axially only to the inner surface of the lower shroud portion 102 and is able to slide axially relative to the outer surface of the shaft 103.

The support bearing assembly 108 shown in the circle labelled Detail A is provided in more detail in FIG. 2 and FIG. 3 of the drawings.

The support bearing assembly 108 surrounds a portion of the upper shaft 103 (upper shaft 3 is shown in FIG. 1 but is not shown in FIG. 2 ease of explanation). It comprises a bearing cage 110 which comprises a sleeve. The sleeve comprises pockets 111 that loosely locate bearing elements 109 such that a portion of the bearing elements 109 extend through the sleeve to engage the upper, outer shaft 103 surface.

In this particular embodiment the bearing elements 109 are ball bearings, specifically two separate sets of three ball bearings 109 with each ball bearing of a set being at the same axial position relative to the steering column assembly 100 but spaced radially equi-distant from each other. Of course more bearings may be used and the bearings may be used in different arrangements.

The bearing assembly 108 also comprises an annular bearing race 112 that can be considered to be a thrust ring having at least one thrust surface that engages the bearing elements 109. The thrust ring 112 is located coaxially around the cage 110. The thrust ring 112 defines a second bearing surface on which the bearing elements 109 can roll.

In this embodiment the bearing assembly also comprises additional annular bearing races 114a, 114b which can be considered to be two race rings. The race rings are located coaxially around the sleeve, axially offset from the thrust ring 112. Each bearing element 109 is in contact with one of the race rings 114a, 114b. This defines a third bearing surface that contacts the bearing elements 109. The race rings 114a, 114b are also in contact with a biasing means 113, which in this embodiment comprises two springs in the form of wavy washers 113a, 113b. The wavy washers are springs which comprise a metal disk with a central hole through which the sleeve passes. The metal disk is deformed out of a single plane by varying amounts around its circumference, hence the "wave". One wavy washer 113b is positioned and compressed between an end stop such as an abutment ring 116 (which encircles the upper shaft 103) and a race ring 114b and the other wavy washer 113a is positioned and compressed between an end stop such as a shoulder 115 of the bearing cage 110 and a race ring 114a. In this particular embodiment, the abutment ring 116 is a made of plastic and "snap fits" into the sleeve of the bearing cage 110, though other materials and arrangements may be used.

Through compression, the biasing means 113a, 113b applies an axially directed thrust to the race rings 114a, 114b which in turn direct a load to the bearing elements 109, causing them to engage the thrust ring 112 surface. The thrust ring 112 reacts to the load acting upon the bearing elements 109 which causes the bearing elements 109 additionally to apply a radial force onto the first bearing surface (upper shaft surface 103 in this embodiment) through the pockets 111 of the bearing cage 110.

Importantly, the radial contact forces occurring between the ball bearings 109 and the surface of the lower shroud portion 102, which are a function of the installed spring force, are selected so that the extra sliding friction of the bearing assembly along the lower shroud portion 102 does not cause an unacceptable increase in the driver effort required for reach adjustment. On the other hand, the contact forces must be large enough for the bearing assembly 108 to be effective in supporting the lower end of the upper column shaft 103.

Use of this arrangement results in the bearing elements 109 maintaining contact with the bearing surface, even when the system vibrates while the engine is active. In short, free play between the ball bearings and the bearing surface is removed, leading to improved NVH.

Figure 4:
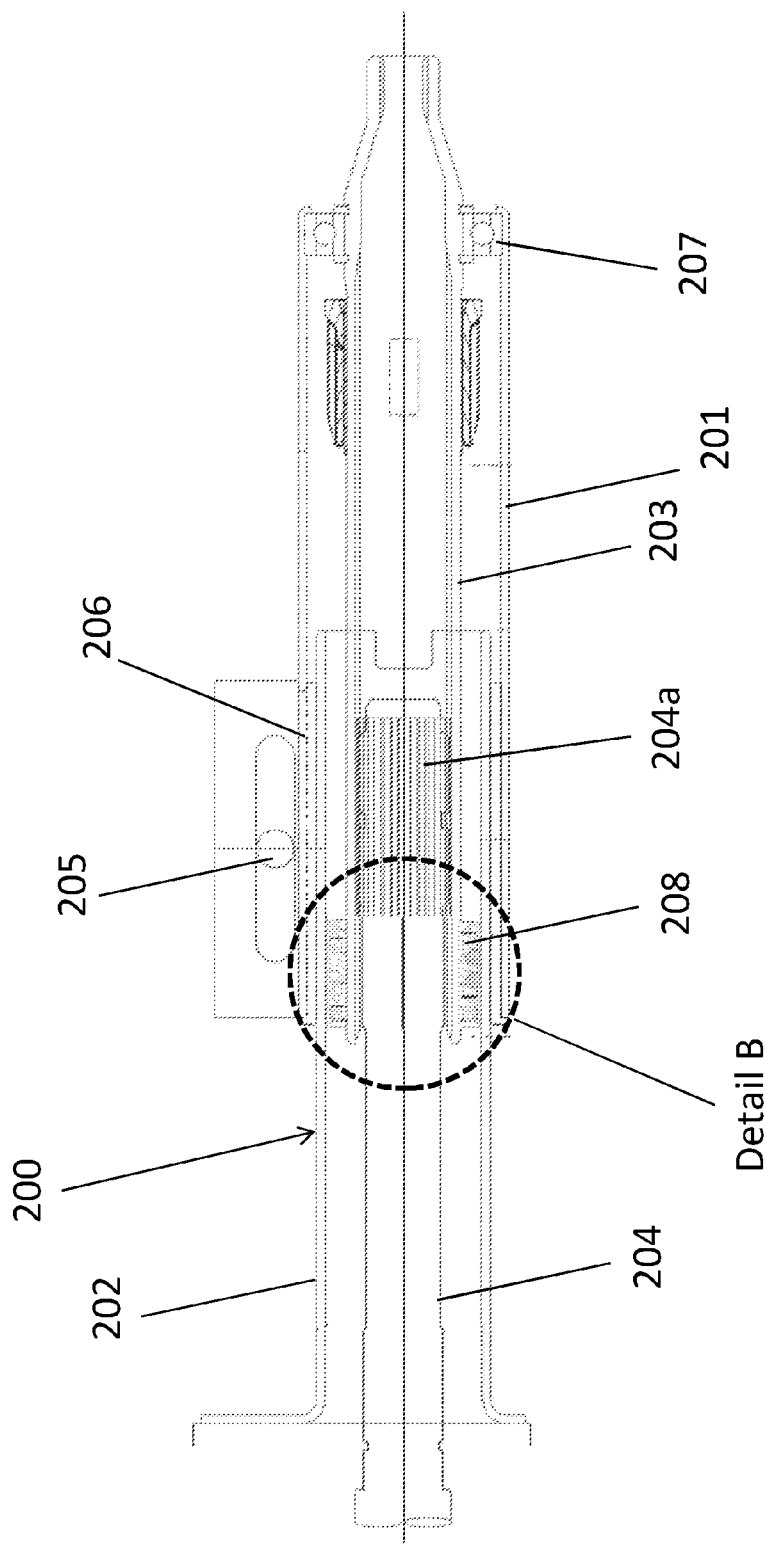
FIG. 4 is a vertical cross sectional view of a second embodiment of a steering column assembly of the present invention.
Figure 5:
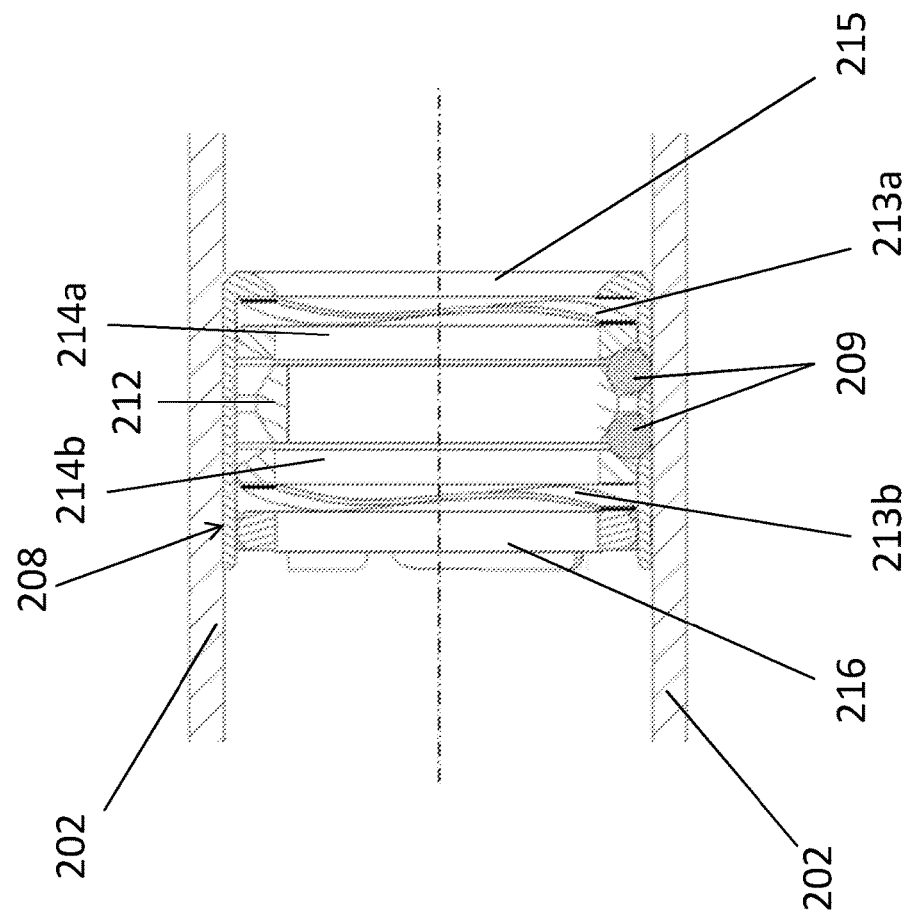
FIG. 5 is cross sectional view of a part of the steering column assembly that is circled as Detail B in FIG. 4, including the extra column bearing assembly that sits between the upper shaft and the lower shroud portion along with a view of the adjacent part of the shrouds.

FIGS. 4 to 5 show a second embodiment of a steering column assembly according to the present invention. All of the features of the embodiment of FIG. 4 are as in FIG. 1 with the exception of the bearing assembly 208 (with all corresponding components having the same final two digits of the reference number). Within FIG. 4 there is a ring labelled Detail B. FIG. 5 provides an enlarged image of the bearing assembly 208 in Detail B.

The bearing assembly 208 is positioned between the upper, outer shaft 203 of the steering column assembly 200 and the lower, inner shroud portion 202. The bearing assembly 208 comprises a bearing cage 210 comprising a sleeve. The sleeve of the bearing cage 210 comprises pockets 211 that loosely locate bearing elements 209 such that a portion of the bearing elements 209 extend through the sleeve to engage a first bearing surface, in this embodiment, the lower, inner shroud 202. The bearing elements 209, in this instance are ball bearings, specifically two separate sets of three ball bearings 209 with each ball bearing of a set being at the same axial position relative to the steering column assembly 200 but spaced radially equi-distant from each other. Of course more bearings may be used and the bearings may be used in different arrangements.

The bearing assembly 208 also comprises an annular bearing race 212 that can be considered to be a thrust ring having at least one thrust surface that engages the bearing elements 209. The thrust ring 212 is located coaxially around the bearing cage 210. The thrust ring 212 defines a second bearing surface on which the bearing elements 209 can roll.

In this embodiment the bearing assembly also comprises additional annular bearing races 214a, 214b which can be considered to be two race rings. The race rings 214a, 214b are located coaxially around the sleeve, axially offset from the annular bearing race 212. Each bearing element 209 is in contact with one of the race rings 214a, 214b. This defines a third bearing surface that contacts the bearing elements 209.

Each race ring 214a, 214b is also in contact with a biasing means 213. In this embodiment, the biasing means 213 comprises two wavy washers. One of the wavy washers 213b is in compressed between a race ring 214b and an end stop such as an abutment ring 216. The other wavy washer 213a is compressed between a second race ring 214a and an end stop such as a shoulder 215 of the bearing cage 210 of the bearing assembly 208.

Through compression, the biasing means 213a, 213b applies an axially directed thrust to the race rings 214a, 214b which in turn direct a load to the bearing elements 209, causing them to engage the thrust ring 212 surface. The thrust ring 212 reacts to the load acting upon the bearing elements 209 which causes the bearing elements 109 additionally to apply a radial force onto the first bearing surface (inner surface of lower shroud portion 202 in this embodiment) through the pockets 211 of the bearing cage 210.

Importantly, the radial contact forces occurring between the ball bearings 209 and the surface of the lower shroud portion 202, which are a function of the installed spring force, are selected so that the extra sliding friction of the bearing assembly along the lower shroud portion 202 does not cause an unacceptable increase in the driver effort required for reach adjustment. On the other hand, the contact forces must be large enough for the bearing to be effective in supporting the lower end of the upper column shaft 203.

Use of this arrangement results in the bearing elements 209 maintaining contact with the bearing surface even when the system vibrates while the engine is active. In short, free play between the ball bearings 209 and the bearing surface is removed, leading to improved NVH.

Figure 6:
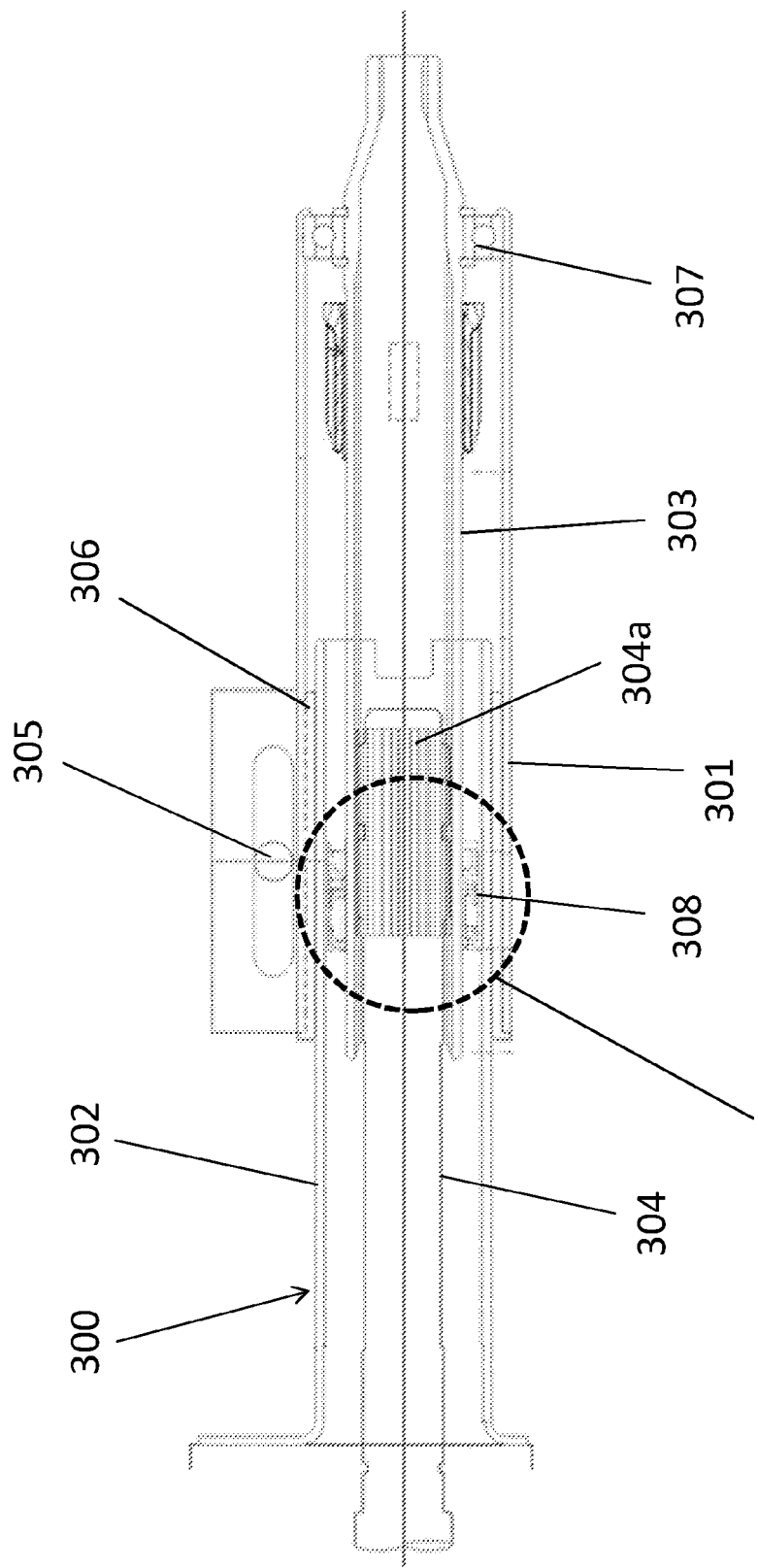
FIG. 6 is a cross sectional view of a third embodiment of a steering column assembly of the present invention.
Figure 7:
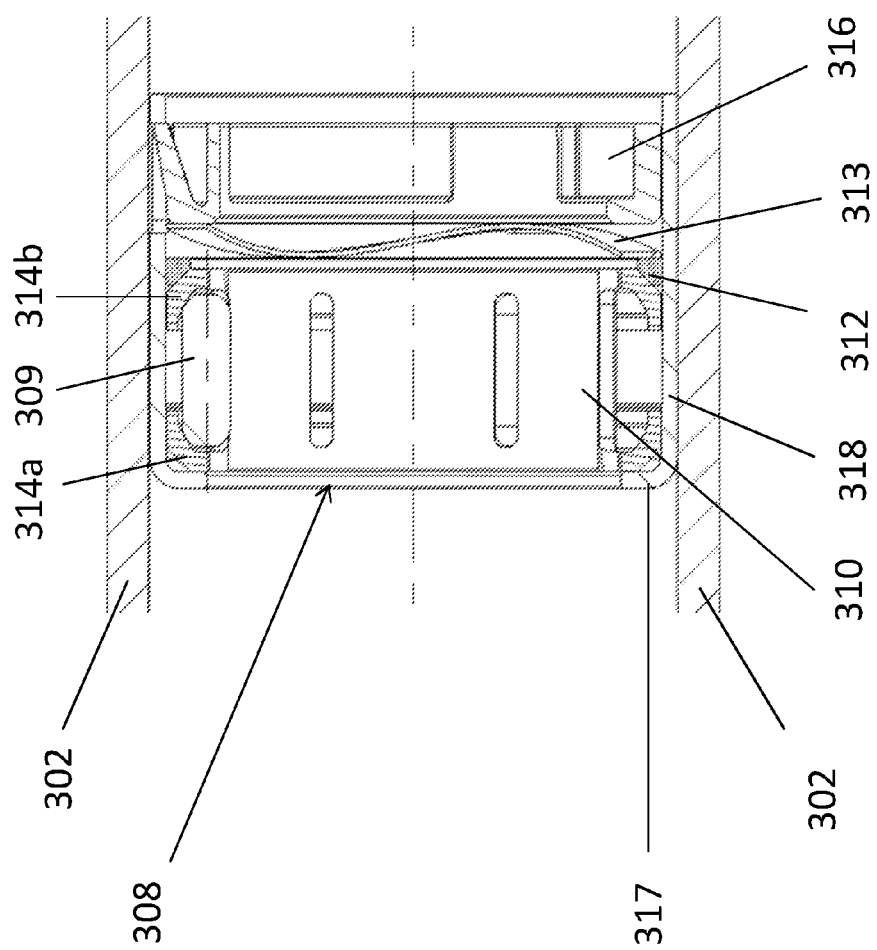
FIG. 7 is cross sectional view of a part of the steering column assembly that is circled as Detail C in FIG. 6, including the extra column bearing assembly that sits between the upper shaft and the lower shroud portion along with a view of the adjacent part of the shrouds.
Figure 8:
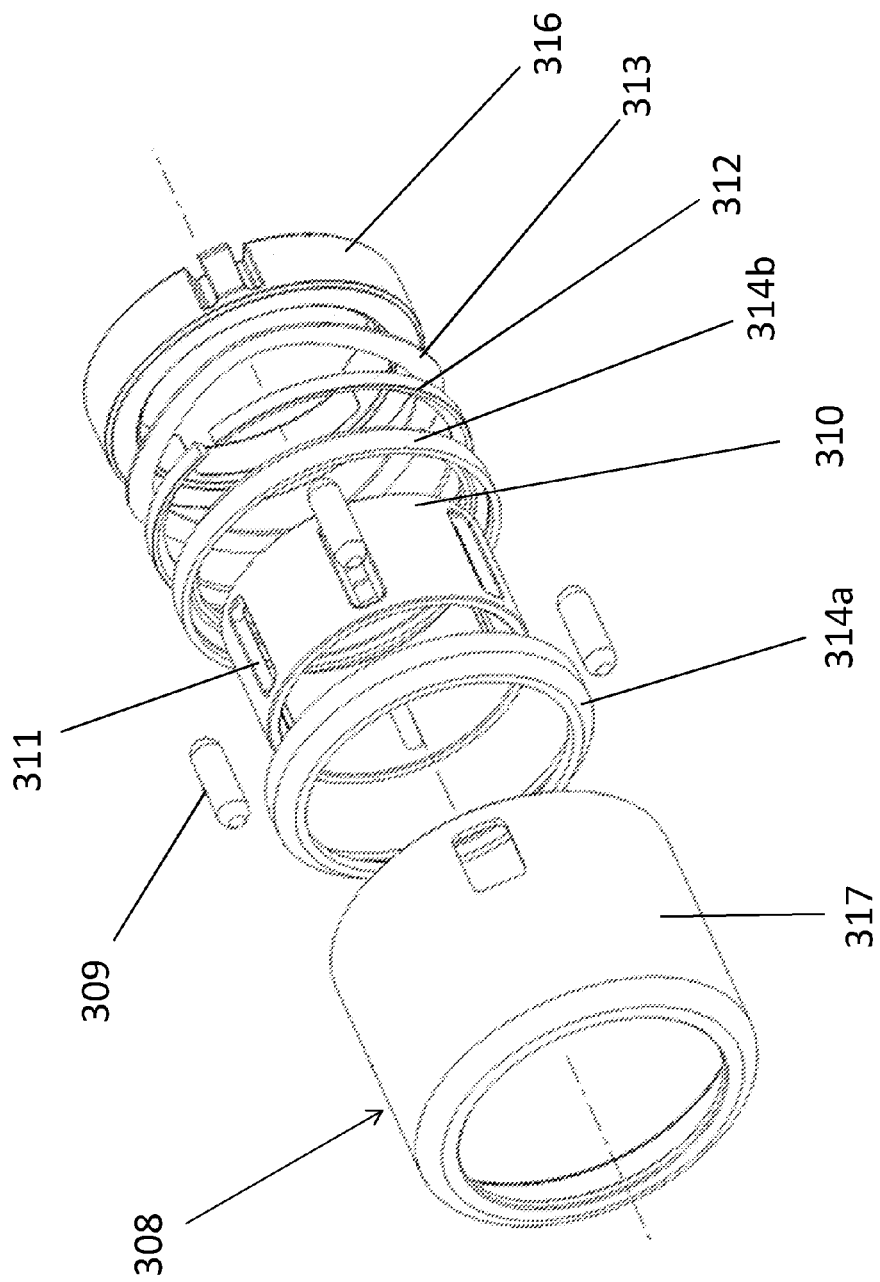
FIG. 8 is an exploded view of the extra column bearing assembly of FIGS. 6 and 7.

FIGS. 6 to 8 provide views of a third embodiment of a steering column assembly 300 which includes a telescopic arrangement within the scope of the present invention. The steering column assembly 300 comprises a shroud 301,302 which comprises a tubular upper shroud portion 301 and a tubular lower shroud portion 302, each of which comprises a cylindrical tube. The shroud portions 301,302 are moveable relative to each other, with the end of the upper shroud portion 301 being a sliding fit within an end of the lower shroud portion 302. The shroud portions 301,302 surround a telescopic steering column shaft 303,304. The shaft 303, 304 comprises an upper shaft portion 303 that at least partially surrounds a lower shaft portion 304, the two portions being connected through complimentary axially extending splines 304a. The opposite end of the upper shaft 303 is tapered so that it can be secured to a steering wheel (not shown). The lower shaft portion 304 is connected to an optional electric power steering gearbox which in turn connects to the road wheels of the vehicle.

The upper shaft portion 303 fits over the lower shaft portion 304 and the upper shaft portion 303 moves whilst the lower shaft portion 304 does not move axially. Similarly, the upper, outer, shroud portion 301 is located towards the steering wheel and slides over the lower, inner, shroud portion 302. The lower shroud portion 302 is axially fixed to a gearbox (not shown). The tubular upper shroud portion 301 may be secured to a fixed part of the vehicle using a clamp mechanism (of which only a clamp bolt 305 is shown) that clamps onto a rail 306 on the upper shroud portion 301. A slit is provided in the upper, outer shroud 301 that is closed up as the clamp assembly is closed to cause the outer shroud portion 301 to grip the lower, inner shroud portion 302.

An upper column bearing assembly 307 is located between the upper shaft 303 and the inner surface of the upper shroud portion 301. This snugly fills the space and ensures that the shaft 303 is located securely within the shroud 301.

An extra column bearing assembly 308 is provided between the inner shroud portion 302 and the upper shaft 303, in the region where they overlap, providing support for the shaft 303,304 close to the joint between the two shaft portions. In use the extra support bearing assembly 308 removes the free play that would otherwise exist and this increases the minimum resonant natural frequency of the whole assembly compared with the same assembly without the support bearing assembly 308. This can provide a welcome improvement in the levels of NVH (noise, vibration and harshness) perceived by a user when the vehicle is travelling along a rough surface. The outer shroud portion 302, support bearing assembly 307 and shaft 303,304 together form a telescopic assembly within the scope of the first aspect of the invention.

To allow the length of the shroud 301,302 to be adjusted, the lower, inner shroud portion 302 must be free to move axially relative to the upper, outer shroud 301. To this end, the support bearing assembly 308 is fixed axially only to the inner surface of the lower shroud portion 302 and is able to slide axially relative to the outer surface of the shaft 303.

The support bearing assembly 308 is shown in more detail in FIG. 7 and FIG. 8 of the drawings.

The support bearing assembly 308 surrounds a portion of the upper shaft 303. It comprises a bearing cage 310 which comprises a sleeve. The sleeve comprises pockets 311 that loosely locate bearing elements 309 such that a portion of the bearing elements 309 extend through the sleeve to engage the upper, outer shaft 303 surface.

In this particular embodiment the bearing elements 309 are roller bearings, specifically a set of six rollers 309 with each roller bearing of a set being at the same axial position relative to the steering column assembly 300 but spaced radially equi-distant from each other. Of course fewer or more bearings may be used and the bearings may be used in different arrangements.

In this embodiment the bearing assembly also comprises annular bearing races 314a, 314b which can be considered to be two race rings. The race rings 314a, 314b are located coaxially around the sleeve of the bearing cage 310. Each race ring 314a, 314b contacts one side of each bearing 309 and each race ring 314a, 314b defines a bearing surface that contacts the bearing elements 309. The bearing surface of the race rings 314a, 314b is tapered.

A first race ring 314b is adjacent to a thrust ring 312 which is also located coaxially around the bearing cage 310. As well as being adjacent to the first race ring 314b, the thrust ring 312 is also adjacent a biasing means 313 located coaxially around the bearing cage 310. In this embodiment the biasing means 313 comprises a spring in the form of a wavy washer 113. The wavy washer 313 is a spring which comprises a metal disk with a central hole through which the outer shaft 303 passes. The metal disk is deformed out of a single plane by varying amounts around its circumference, hence the "wave". The wavy washer 313 is abutted by an abutment ring 316 which acts as an end stop and which surrounds the upper shaft 303. The wavy washer 313 is compressed between the thrust ring 312 the abutment ring 316.

The bearing assembly 308 also comprises a support 318 which surrounds all of the other components of the bearing assembly 308. The support 318 is a cover which is coaxial to the rings (e.g., race rings, wavy washer, thrust ring, bearing cage) of the bearing assembly 308. When positioned in the steering column assembly 300 it is the only component of the bearing assembly 308 which may make physical contact with the inner surface of the inner lower shroud portion 302 (with the possible exception of a portion of the abutment ring 316).

In this particular embodiment, the abutment ring 316 is a made of plastic and "snap fits" into the support 318 though other materials and arrangements may be used. When snapped in position the abutment ring 316 does not move relative to the support 318.

As stated the second race ring 314a is adjacent to, and in contact with, the roller bearings 309, but it is also adjacent to, and in contact with, an end stop such as a shoulder 317 of the support 318.

As the biasing means 309 is compressed between the abutment ring 316 and the thrust ring 312, and the abutment ring 316 may not move relative to the support 318, the compressed thrust of the biasing means 309 acts in an axial direction upon the thrust ring 312. This thrust is transferred to the first race ring 314b and in turn to the roller bearings 309. Finally the thrust is transferred from the roller bearings 309 to the second race ring 314a which is adjacent to the shoulder 317 of the support 318. The shoulder 317 is not movable relative to the support 318.

Due to the above arrangement, the compressed thrust of the biasing means causes the race rings 314a, 314b with a tapered bearing surface to apply a radial force onto the first bearing surface of the upper shaft 303.

Importantly, the radial contact forces occurring between the roller bearings 309 and the surface of the upper shaft 303, which are a function of the installed spring force, are selected so that the extra sliding friction of the bearing assembly 308 along the upper shaft 303 does not cause an unacceptable increase in the driver effort required for reach adjustment. On the other hand, the contact forces must be large enough for the bearing to be effective in supporting the lower end of the upper column shaft 303.

Use of this arrangement results in the bearing elements 309 maintaining contact with the bearing surface even when the system vibrates while the engine is active. In short, free play the between the ball bearings 309 and the bearing surface is removed, leading to improved NVH.

Figure 9:
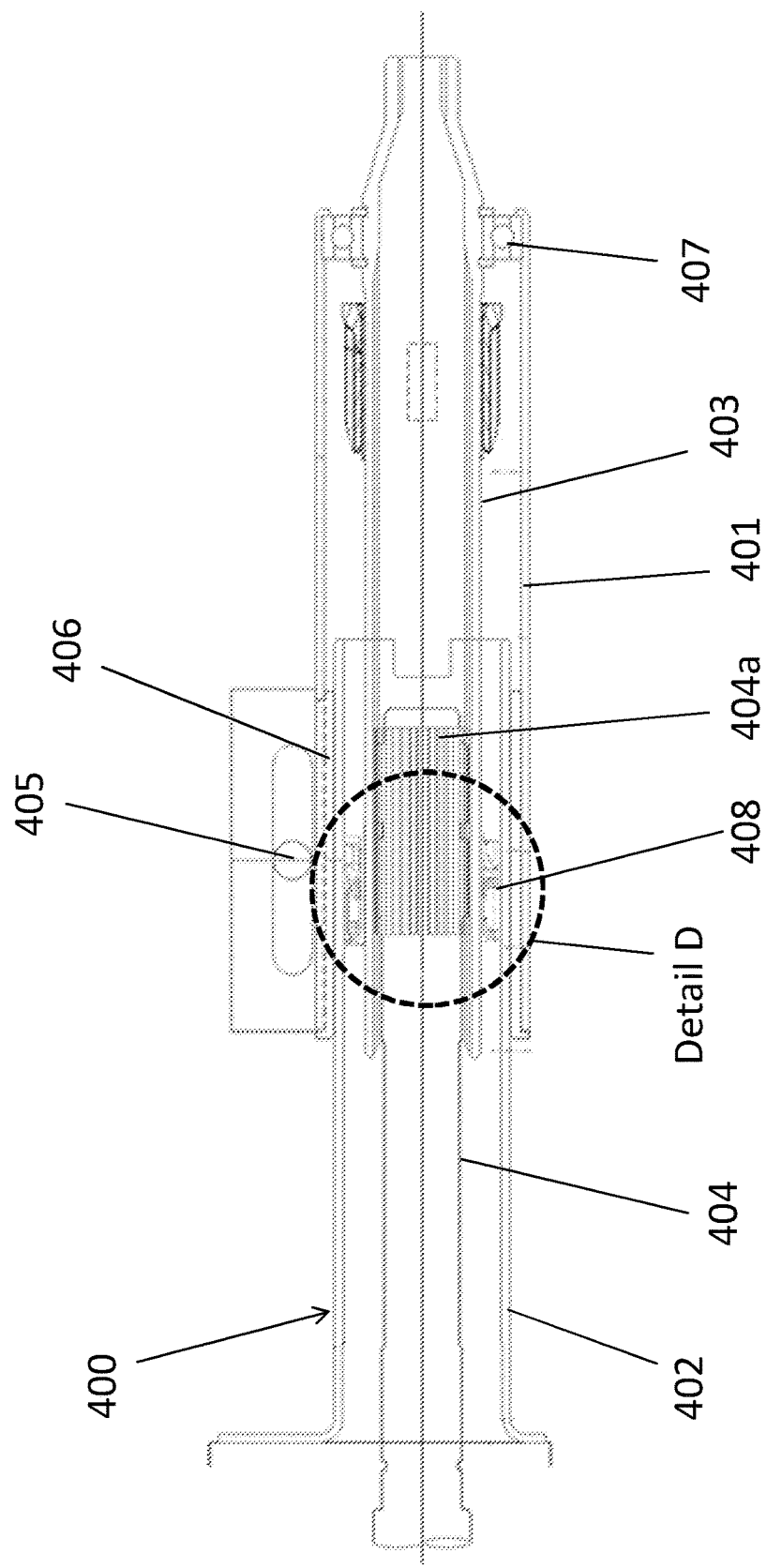
FIG. 9 is a cross sectional view of a fourth embodiment of a steering column assembly of the present invention.
Figure 10:
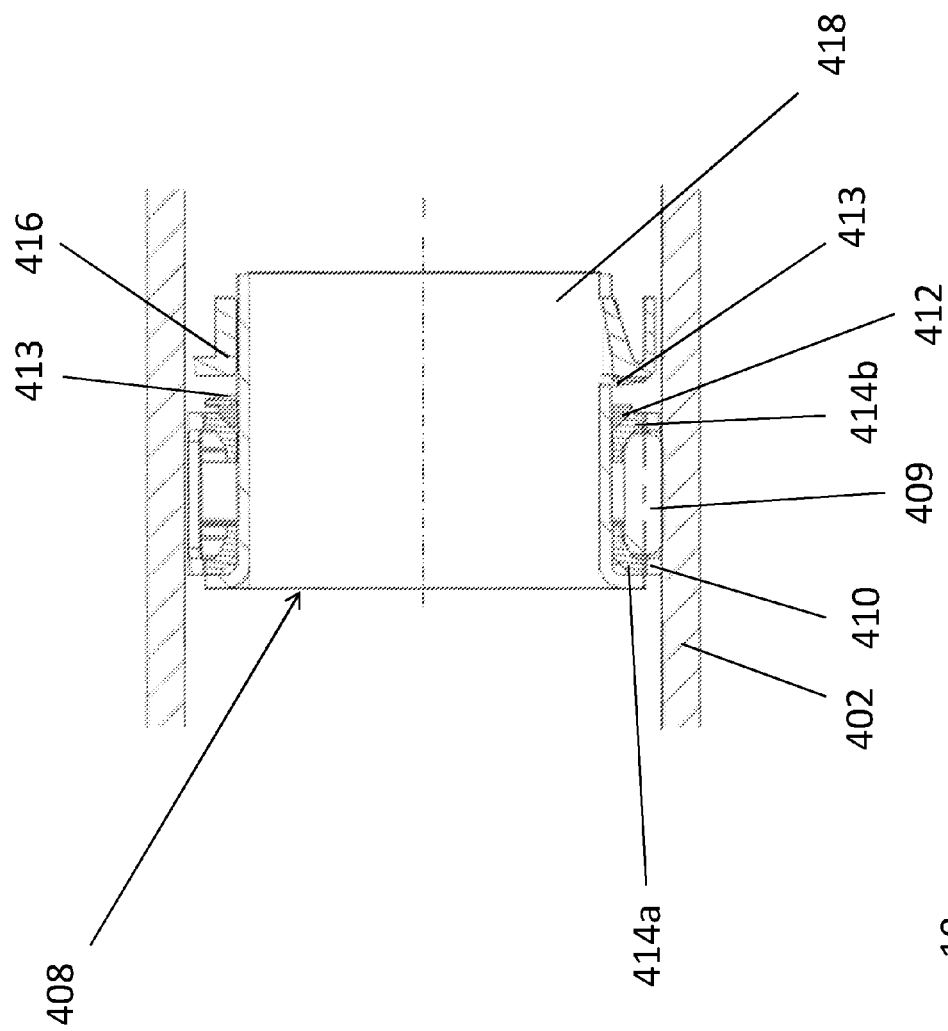
FIG. 10 is cross sectional view of a part of the steering column assembly that is circled as Detail D in FIG. 9, including the extra column bearing assembly that sits between the upper shaft and the lower shroud portion along with a view of the adjacent part of the shrouds.

FIGS. 9 to 10 show an alternative embodiment to that of FIGS. 6 to 8 according to the present invention. All of the features of the embodiment of FIG. 6 are as in FIG. 9 with the exception of the bearing assembly 408 (with corresponding components having the same final two digits of the reference number). The embodiment of FIGS. 9 and 10 essentially differs from the embodiment of FIGS. 6, 7 and 8 in that the bearing elements roll on the inner shroud portion as opposed to rolling on the outer, upper shaft. Within FIG. 9 there is a ring labelled Detail D. FIG. 10 provides an enlarged image of the bearing assembly 408 in Detail D.

Though not shown in FIG. 10, the bearing assembly 408 encircles the upper shaft 403 of the steering column assembly 400.

The bearing assembly 408 comprises a support 418 which surrounds the upper shaft 403. The support 418 supports the other components of the bearing assembly 408. The support 418 comprises a shoulder 417 which acts as an end stop at one end.

In this embodiment the bearing assembly also comprises annular bearing races 414a, 414b which can be considered to be two race rings. The race rings 414a, 414b are located coaxially around the support 418. The second race ring 414a is adjacent to one side of the shoulder 417 of the support 418. Each race ring 414a, 414b engages a portion of each bearing 409 and each race ring 414a, 414b defines a bearing surface that contacts the bearing elements 409. The bearing surface of each of the race rings 414a, 414b is tapered.

The bearing assembly 408 also comprises a bearing cage 410 having a sleeve which surrounds the bearing elements 409 and holds them in position against the bearing surfaces of the race rings 414a, 414b. The sleeve of the bearing cage 410 comprises pockets 411 which loosely locate the bearing elements 409 such that a portion of the bearing elements 409 extend through the sleeve to engage the lower, inner shroud portion 402 surface.

In this particular embodiment the bearing elements 409 are roller bearings, specifically a set of six roller bearings 409, with each roller bearing 409 of a set being at the same axial position relative to the steering column assembly 400 but spaced radially equi-distant from each other. Of course more or fewer bearings may be used and the bearings may be used in different arrangements.

As well as being in contact with the roller bearings 409, the first race ring 414b is adjacent to a thrust ring 412 which is also located coaxially around the support 418. The thrust ring 412 is also adjacent to a biasing means 413 located coaxially around the support 410. In this embodiment the biasing means 413 comprises a spring in the form of a wavy washer 413. The wavy washer 413 is a spring which comprises a metal disk with a central hole through which the outer shaft 403 passes. The metal disk is deformed out of a single plane by varying amounts around its circumference, hence the "wave". The wavy washer 413 is abutted by an abutment ring 416 which acts as an end stop and which also surrounds the support 418. The wavy washer 413 is compressed between the thrust ring 412 and the abutment ring 416.

In this particular embodiment, the abutment ring 416 is a made of plastic and "snap fits" into the support 418, though other materials and arrangements may be used. When snapped in position the abutment ring 416 does not move relative to the support 418.

When positioned in the steering column assembly 400, the support 418 is the only component of the bearing assembly 408 which may make physical contact with the outer surface of the outer, upper shaft 403 (with the possible exception of a portion of the abutment ring 416).

As the biasing means 409 is compressed between the abutment ring 416 and the thrust ring 412, and the abutment ring 416 may not move relative to the support 418, the compressed thrust of the biasing means 409 acts upon the thrust ring 412 in an axial direction. This thrust is transferred to the first race ring 414b and in turn to the roller bearings 409. Finally the thrust is transferred from the roller bearings 409 to the second race ring 414a which is adjacent to the shoulder 417 of the support 418. The shoulder 417 is not movable relative to the support 418.

Due to the above described arrangement, the compressed thrust of the biasing means causes the race rings 414a, 414b with a tapered bearing surface to apply a radial force on the bearing elements towards the bearing surface.

Importantly, the radial contact forces occurring between the roller bearings 409 and the surface of the lower shroud portion 402, which are a function of the installed spring force, are selected so that the extra sliding friction of the bearing assembly along the lower shroud portion 402 does not cause an unacceptable increase in the driver effort required for reach adjustment. On the other hand, the contact forces must be large enough for the bearing to be effective in supporting the lower end of the upper column shaft 403.

Use of this arrangement results in the bearing elements 409 maintaining contact with the bearing surface even when the system vibrates while the engine is active. In short, free play the between the ball bearings 409 and the bearing surface is removed, leading to improved NVH.

Figure 11:
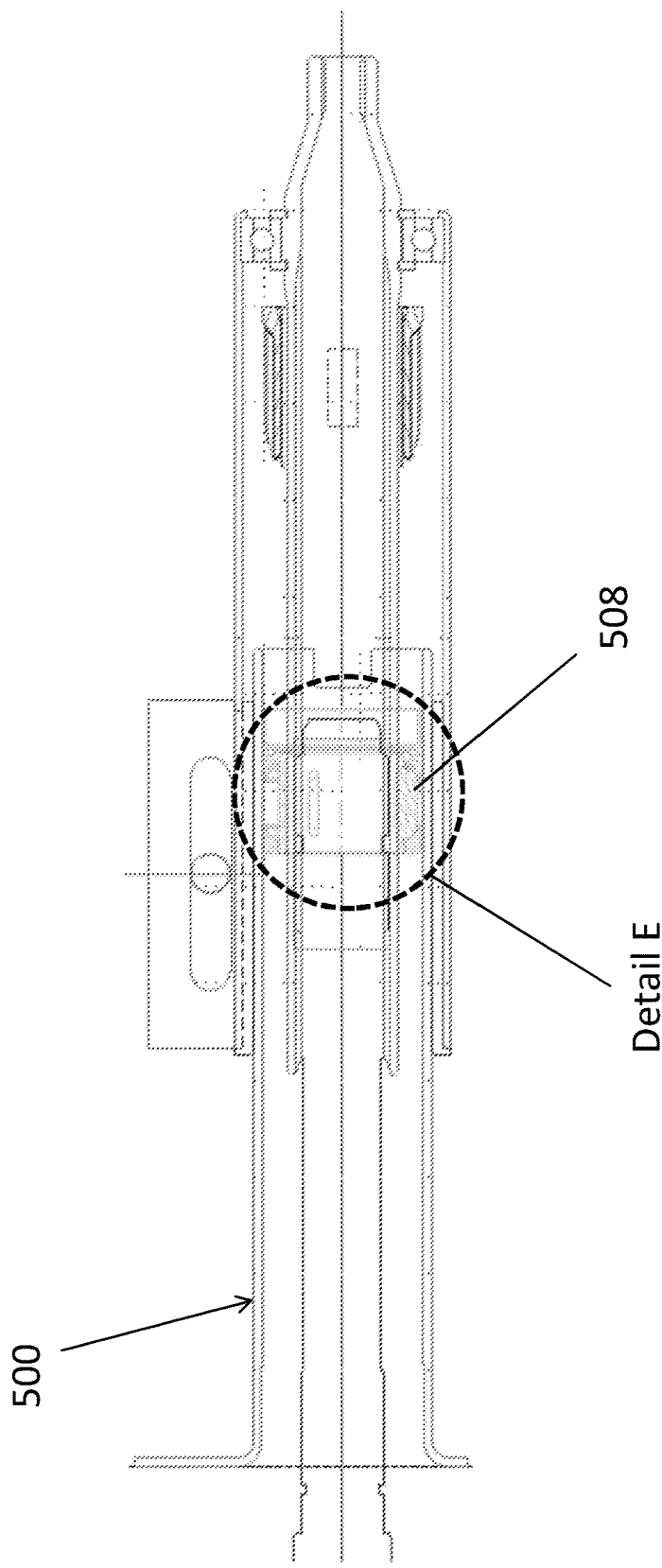
FIG. 11 is a cross sectional view of a fifth embodiment of a steering column assembly of the present invention.
Figure 12:
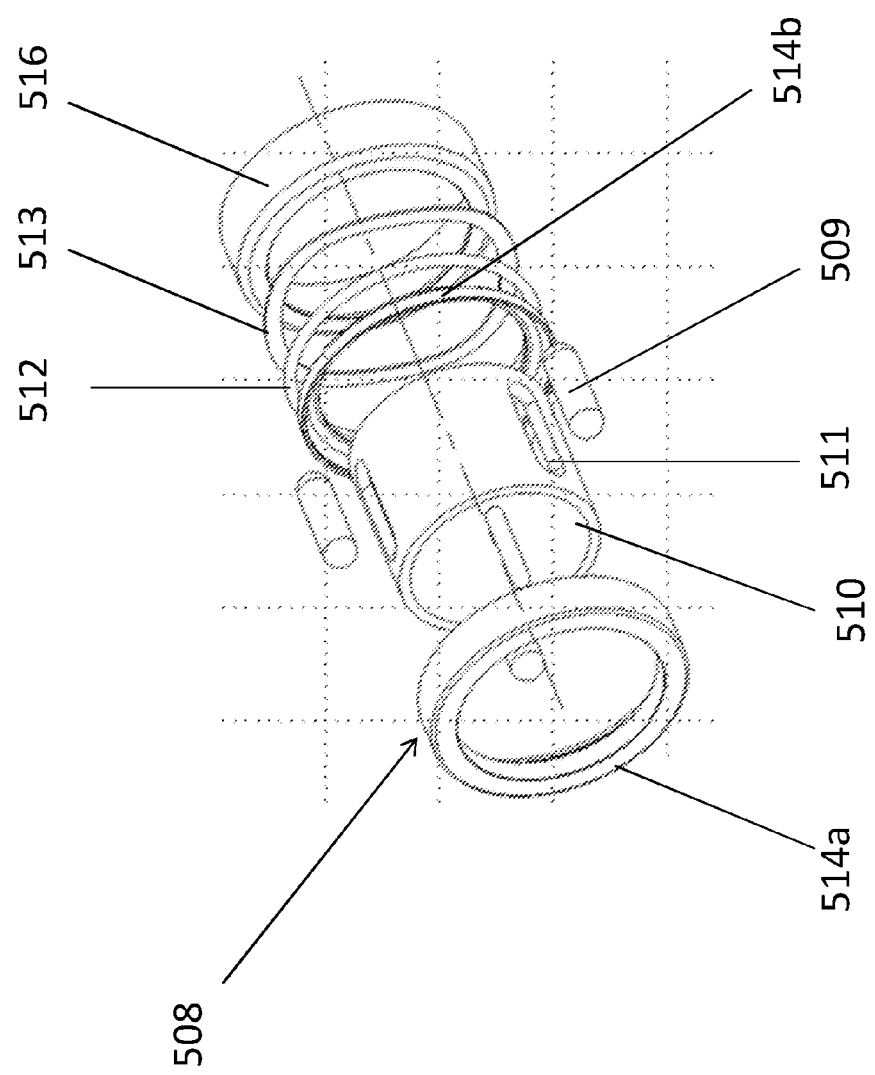
FIG. 12 is cross sectional view of a part of the steering column assembly that is circled as Detail E in FIG. 11, including the extra column bearing assembly that sits between the upper shaft and the lower shroud portion along with a view of the adjacent part of the shrouds.
Figure 13:
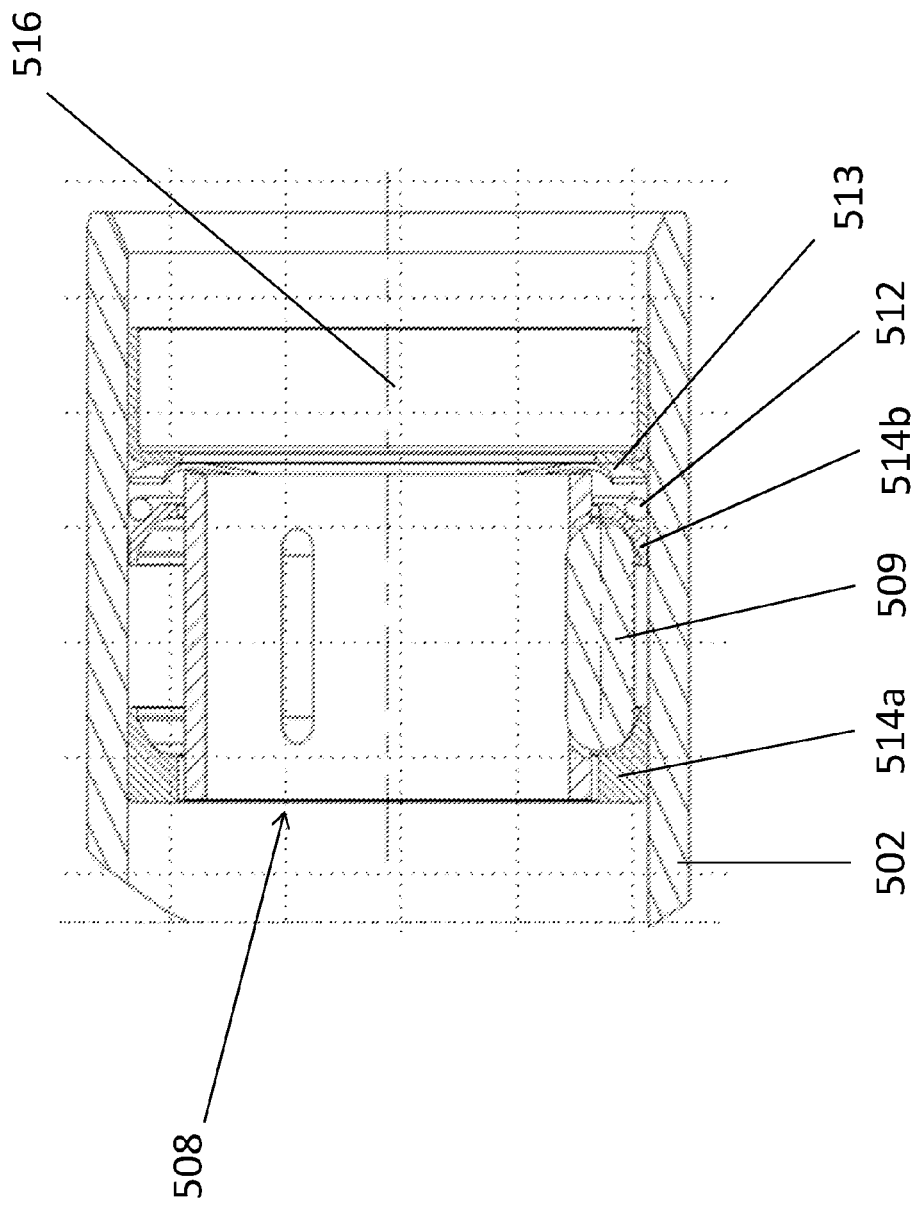
FIG. 13 is an exploded view of the extra column bearing assembly of FIGS. 11 and 12.

FIGS. 11, 12 and 13 show a fifth embodiment of the present invention. This particular embodiment is a variant of the third embodiment shown in FIGS. 6, 7 and 8 and differs only in the bearing assembly used.

In FIG. 11, the support bearing assembly 508 is shown in the circle labelled Detail E and is provided in more detail in FIGS. 12 and FIG. 13 of the drawings.

Detail E is shown in more detail in FIGS. 12 and 13.

Unlike the third embodiment, the bearing assembly of the fifth embodiment does not comprise a support 318. The bearing assembly 508 of the fifth embodiment does however comprise all other components of the third embodiment.

The support bearing assembly 508 surrounds a portion of the upper shaft 503. It comprises a bearing cage 510 which comprises a sleeve. The sleeve comprises pockets 511 that loosely locate bearing elements 509 such that a portion of the bearing elements 509 extend through the sleeve to engage the upper, outer shaft 503 surface.

In this particular embodiment the bearing elements 509 are roller bearings, specifically a set of three roller bearings 509 with each roller bearing of a set being at the same axial position relative to the steering column assembly 500 but spaced radially equi-distant from each other. Of course fewer or more bearings may be used and the bearings may be used in different arrangements.

In this embodiment the bearing assembly also comprises annular bearing races 514a, 514b which can be considered to be two race rings. The race rings 514a, 514b are located coaxially around the sleeve of the bearing cage 510. Each race ring 514a, 514b contacts one non-rolling side of each bearing 509 and each race ring 514a, 514b defines a bearing surface that contacts the bearing elements 509. The bearing surface of each race ring 514a, 514b is tapered.

The first race ring 514b is adjacent to a thrust ring 512 which is also located coaxially around the sleeve of the bearing cage 510. As well as being adjacent to the first race ring 514b, the thrust ring 512 is adjacent a biasing means 513 located coaxially around the bearing cage 510. In this embodiment the biasing means 513 comprises a spring in the form of a wavy washer 513. The wavy washer 513 is a spring which comprises a metal disk with a central hole through which the outer shaft 503 passes. The metal disk is deformed out of a single plane by varying amounts around its circumference, hence the "wave". The wavy washer 513 is abutted by an abutment ring 516 which acts as an end stop and which also surrounds the outer shaft 503. The abutment ring 516 is fixed to the lower shroud portion 502 and therefore cannot move relative to it. In this particular embodiment it is press fit. The wavy washer 513 is compressed between the thrust ring 512 and the abutment ring 516.

The second race ring 514a also acts as an end stop as it is fixed axially in position and as stated above is adjacent to, and in contact with, the roller bearings 509. The second race ring 514a is press fit into position in this embodiment.

As the biasing means 509 is compressed between the abutment ring 516 and the thrust ring 512, and the abutment ring 516 may not move relative to the lower shroud portion 502, the compressed thrust of the biasing means 509 acts upon the thrust ring 512 in an axial direction. This thrust is transferred to the first race ring 514b and in turn to the roller bearings 509. Finally the thrust is transferred from the roller bearings 509 to the second race ring 514a which is fixed to the lower shroud portion 502.

Due to the above described arrangement, the compressed thrust of the biasing means causes the first race ring 514a with a tapered bearing surface to apply a radial force which urges the bearing elements 509 onto contact with the first bearing surface through the pockets 511 of the bearing assembly 508.

Importantly, the radial contact forces occurring between the roller bearings 509 and the surface of the upper shroud portion 501, which are a function of the installed spring force, are selected so that the extra sliding friction of the bearing assembly 508 along the upper shroud portion 501 does not cause an unacceptable increase in the driver effort required for reach adjustment. On the other hand, the contact forces must be large enough for the bearing to be effective in supporting the lower end of the upper column shaft 503.

Use of this arrangement results in the bearing elements 509 maintaining contact with the bearing surface even when the system vibrates while the engine is active. In short, free play the between the ball bearings 509 and the bearing surface is removed, leading to improved NVH.

The fifth embodiment avoids the need to prepare a bearing assembly 508 which is later fitted to the lower shroud portion 502. Instead the components of the bearing assembly 508 are assembled directly onto the lower shroud portion. This can reduce costs by eliminating need for a support. In addition it allows for larger diameter roller bearings to be packed into the same space.

Of course, the fifth embodiment may be modified such that the first bearing surface of the bearing assembly is the inner surface of the lower shroud portion rather than the outer surface of the shaft. In this embodiment the outer race ring (corresponding to second race ring 514a) and the abutment ring (corresponding to 516) are both fixed axially to the outer surface of the upper shaft portion.

The invention therefore takes advantage of the fact that the radial disturbance forces which arise within the column at the vibration frequencies of concern are quite small. When larger, quasi-static, radial forces are applied, such as a driver leaning heavily on the rim of the steering wheel, small clearances may be temporarily permitted to arise in certain locations within the bearing but, realistically, these do not lead to unwanted vibrations. By avoiding the use of a very large said radial preload, the contact forces between the bearing and the bore of the lower tube are kept at a moderate level. Therefore the frictional resistance to the bearing assembly sliding inside the lower tube is also kept fairly low so that the increases in the Reach adjustment effort and Crash collapse force are acceptable. It is possible to manufacture the bore of the Lower Column Tube sufficiently smooth and accurate using economic tube-forming methods and without recourse to additional machining.

In accordance with the provisions of the patent statutes, the principle and mode of operation of this invention have been explained and illustrated in its preferred embodiments.

However, it must be understood that this invention may be practiced otherwise than as specifically explained and illustrated without departing from its spirit or scope.

The invention claimed is:

1. A telescopic steering column assembly comprising an upper shroud portion and a lower shroud portion, the upper shroud portion and the lower shroud portion being able to move relatively along a common linear path during telescopic adjustment of the assembly, a telescopic steering shaft that passes through the upper shroud portion and the lower shroud portion and is supported by the upper and lower shroud portions through a support bearing assembly that acts between an upper shaft portion of the telescopic steering shaft and the lower shroud portion that move relative to one another axially during telescopic adjustment of the telescopic steering column assembly for reach, the support bearing assembly in use removing free play between the telescopic steering shaft and the upper and lower shroud portions that would otherwise occur in at least one direction orthogonal to the telescopic adjustment, in which the support bearing assembly comprises:

a set of bearings elements, a bearing cage comprising a sleeve that is located between an outer face of the upper shaft portion and an inner face of the lower shroud portion and is free to move axially relative to one of the upper shaft portion and the lower shroud portion, the cage including pockets that extend through the sleeve, each pocket loosely locating a bearing element such that a portion of the bearing element extends through the cage to engage with a first bearing race surface defined by one of the upper shaft portion and the lower shroud portion, an annular bearing race having a tapered second bearing race surface that engages the bearing elements, the annular bearing race being located between the cage and the upper shaft portion or the cage and the lower shroud portion so that the annular bearing race is on the opposite side of the cage to the first bearing race surface, and a biasing means which applies an axially directed thrust to the bearing elements to force them into engagement with the second bearing race surface of the annular bearing race, the thrust being reacted by the second bearing race surface thereby to cause the bearing elements additionally to apply a radial force onto the first bearing race surface.

2. The assembly of claim 1, wherein the bearing elements are ball bearings that are arranged at spaced locations around the circumference of the cage.

3. The assembly of claims 1, wherein the bearing elements are roller bearings.

4. The assembly of claims 3, wherein end faces of the bearing elements are chamfered or tapered, with a straight or curved face, in regions thereof that contact the second bearing race surface.

5. The assembly of claim 1, wherein the lower shroud portion forms the first bearing race surface.

6. The assembly of claim 1, wherein the upper shaft portion forms the first bearing race surface.

7. The assembly of claim 1, wherein the annular bearing race comprises an annular thrust ring defining two opposed tapered second bearing faces arranged respectively on opposing sides of a centre line of the ring, the bearing elements comprises ball bearings and is divided into two sets of elements with the bearings of each set arranged around a circumferential path, one set engaging one of the second bearing faces and the other set the other bearing face so that the ring is located substantially between the two sets bearing elements.

8. The assembly of claim 1, wherein the annular bearing race comprises a thrust ring.

9. The assembly of claim 1, wherein a spacer defining a race ring is provided that is located between the biasing means and the bearing elements, so that the biasing means acts on the bearing elements through the race ring.

10. The assembly of claim 9, wherein the race ring includes a tapered third bearing race surface on which the bearing elements are configured to roll in use as the telescopic steering shaft is turned.

11. The assembly of claim 9, wherein there are two race rings.

12. The assembly of claim 11, wherein the assembly comprises end stops which hold the race rings in place on the bearing assembly.

13. The assembly of claim 12, wherein the end stops comprise a radially extending flange or shoulder formed integral to the cage, and the other is a removable radially extending flange or shoulder secured to the cage by tabs that engage in holes or by a threaded engagement.

14. The assembly of claim 13, wherein the spacing between the flanges or shoulders are adjustable to allow a radial load to be adjusted.

15. The assembly of claim 12, wherein one of the end stops are removable from the support and are adjustable to enable the spacing between the end stops to be varied thereby to adjust the radial load on the bearing.

16. The assembly of claim 15, wherein the cage is slid into the shroud and the support that bears the end stops may he located on the upper shaft portion inside the cage, a pair of bearing elements each defining a second bearing race being slid onto the sleeve, and the biasing means acting between the end stop and one of the pair of bearing elements.

17. The assembly of claim 15, wherein the support is fixed in position axially relative to the upper shaft portion or lower shroud portion.

18. The assembly of claim 12, wherein the end stops, abutment rings or race rings comprise components fixed axially onto the lower shroud portion.

19. The assembly of claim 1, wherein the annular bearing race comprises at least one race ring.

20. The assembly of claim 1, wherein the bearing elements are roller elements with tapered ends, the roller elements are located at spaced positions around a circumference of the upper shaft portion with the cage slid onto the upper shaft portion so that the bearings contact the upper shaft portion, and the annular bearing second race comprises a pair of rings that each have a tapered face defining a second bearing surface, the rings being located at a respective end of the rollers, a support being provided that fits around the rings and defines a pair of end stops, the two rings and the bearings being located between the end stops, and the biasing means acting between at least one end stop and one of the ends of the bearings.

21. The assembly of claim 1, wherein the bearing elements are roller elements with tapered ends and the roller elements are located at spaced positions around a circumference of the upper shaft portion with the cage slid onto the upper shaft portion so that the bearing elements contact the upper shaft portion, and the annular bearing race comprises a pair of rings that each have a tapered face defining a second bearing race surface, the rings being located at a respective end of the rollers, one race ring and the bearing elements being located between the end stops, and the biasing means acting between at least one end stop and one of the ends of the bearing elements, wherein the end stops are an abutment ring and a second race ring fixed to the inner surface of the lower shroud portion by press fitting.

* * * * *